United States Patent
Youssef

[19]

[11] Patent Number: 6,056,806

[45] Date of Patent: May 2, 2000

[54] APPARATUS FOR THE HEATING-UP AND DEGASSING OF WATER

[75] Inventor: Mustafa Youssef, Zürich, Switzerland

[73] Assignee: Asea Brown Boveri AG, Baden, Switzerland

[21] Appl. No.: 09/034,232

[22] Filed: Mar. 4, 1998

[30] Foreign Application Priority Data

Mar. 27, 1997 [DE] Germany ............... 197 12 993

[51] Int. Cl.$^7$ ......................... B01D 19/00
[52] U.S. Cl. .................. 95/254; 95/257; 95/262; 95/264; 96/190; 96/197; 96/200; 261/114.1; 261/114.5
[58] Field of Search .............. 95/254, 257, 262, 95/264; 96/189, 190, 197, 198, 199, 200; 261/114.1, 114.5, 115, 117

[56] References Cited

U.S. PATENT DOCUMENTS

| | | |
|---|---|---|
| 1,584,758 | 5/1926 | Ehrhart . |
| 2,078,288 | 4/1937 | Sherman ................................ 95/257 |
| 2,605,856 | 8/1952 | Kirkpatrick et al. .................. 96/199 |
| 2,663,547 | 12/1953 | Evans, Jr. et al. .................... 96/199 |
| 2,792,904 | 5/1957 | Sebald ................................... 96/198 |
| 3,834,133 | 9/1974 | Bow . |
| 3,938,588 | 2/1976 | Coit et al. . |
| 4,673,464 | 6/1987 | Zeitsch ............................... 261/114.5 |
| 4,981,113 | 1/1991 | Kannan et al. . |
| 5,269,976 | 12/1993 | Biddulph et al. .................. 261/114.1 |
| 5,468,425 | 11/1995 | Nutter .............................. 261/114.5 |

FOREIGN PATENT DOCUMENTS

| | | |
|---|---|---|
| 0463448B1 | 1/1992 | European Pat. Off. . |
| 564044 | 11/1932 | Germany . |
| 187132 | 9/1961 | Germany . |
| 1234745 | 2/1967 | Germany . |
| 19513204A1 | 10/1996 | Germany . |

*Primary Examiner*—David A. Simmons
*Assistant Examiner*—Minh-Chau T. Pham
*Attorney, Agent, or Firm*—Burns, Doane, Swecker & Mathis, L.L.P.

[57] ABSTRACT

An apparatus for the heating-up and degassing of make-up water by means of steam in a power station plant. The apparatus includes a steam condenser having a casing wall and a second casing wall mounted on the steam condenser. The casing walls are spaced apart and form a mixing chamber and a separation column, with the mixing chamber being located above the separation column. The mixing chamber includes a means for spraying oxygen-rich make-up water. A receiver is positioned to collect water from the separation column and includes a water outlet opening in fluid communication with an interior of the steam condenser. The steam condenser casing wall has a steam-inlet opening located between the receiver and the separation column through which steam flows into and through the separation column and into the mixing chamber due to a lower pressure prevailing in the first stage mixing chamber relative to a pressure in an interior of the condenser. In operation, when the oxygen-rich make-up water is sprayed into the mixing chamber of the apparatus and is brought into contact with the steam introduced through the steam-inlet opening in the steam condenser casing wall, the oxygen-rich make-up water is essentially degassed of most gases by a drop in pressure due to the spraying and an increase in temperature by contact with the steam. Subsequently, the oxygen-rich make-up water enters the separation column located below the mixing chamber where the oxygen-rich make-up water is further degassed and heated up before it is collected in the receiver and fed to the steam condenser.

7 Claims, 2 Drawing Sheets

APPARATUS FOR THE HEATING-UP AND DEGASSING OF WATER

This application claims priority under 35 U.S.C. §§119 and/or 365 to No. 197 12 993.5 filed in Germany on Mar. 27, 1997; the entire content of which is hereby incorporated by reference.

BACKGROUND OF THE INVENTION

1. Field of the Invention

The present invention relates to the heating-up and degassing of water by means of steam in a power station plant. It relates to a corresponding apparatus as described in the preamble of the first claim.

2. Discussion of Background

In modern power station plants the consumption of make-up water is very high. Thus conventional power station plants already normally require as make-up water 1 to 5% of the entire circulating mass flow of the steam/condensate circuit. In combined-cycle plants, however, in which the emission of nitrous oxides is reduced by means of steam injection, this consumption of make-up water may rise to more than 50%. In this case, as a result of today's requirements, a degassing range of the make-up water with respect to $O_2$ from 8000 ppb (parts per billion) i.e. saturation state of the water with the atmospheric air at room temperature—down to about 5 ppb with simultaneous heating of around 20K and above is required.

The simple, direct injection of make-up water into the condenser, which injection is known per se and is conventional practice in the case of small quantities of make-up water from 1 to 5%, would lead to flooding of the tube banks on account of said large quantities. This would result in severe impairment of the function of the condenser and is therefore approved by neither the condenser supplier nor the condenser operator. In addition, the desired heating-up and degassing cannot be achieved in this way. Above a quantity of make-up water of about 5% of the total mass flow, conventional apparatuses are used for the heating-up and degassing, these apparatuses being arranged separately from the condenser and, depending on their construction, being supplied with exhaust steam or higher-grade steam for the heating-up and degassing via corresponding lines. However, the use of such apparatuses is only appropriate above a requirement for make-up water of more than 30% of the total mass flow. At a requirement for make-up water of between 5 and 30%, the cost of a separate degasser calls the use of the same into question.

EP 0 463 448 B2, for example, discloses a known apparatus for the heating-up and degassing of make-up water in large quantities.

SUMMARY OF THE INVENTION

Accordingly, one object of the invention, on the basis of the knowledge that the heat of the exhaust steam collecting in the condenser of an electric generating plant is usually regarded as an unwanted waste product, is to provide a novel, simple and inexpensive apparatus for the heating-up and degassing of 5 to 30% of make-up water by means of exhaust steam in a power station plant.

According to the invention, this object is achieved by the features of the first claim.

The essence of the invention is to arrange an apparatus for the heating-up and degassing of make-up water directly on the side wall of a condenser, said apparatus comprising a mixing chamber, in which a plurality of water-injection means are arranged above a separation column and a receiver closes off the apparatus below the separation column, the casing wall having a steam-inlet opening between the receiver and the separation column, through which steam-inlet opening steam flows in from the condenser, and furthermore the receiver communicates with the interior of the condenser via a water outlet. The inert-gas mixture released from the make-up water can be drawn off from the mixing chamber through a gas-outlet opening, in which a lower pressure prevails than in the interior of the condenser. Here, it is of particular advantage if the gas outlet is connected to a condenser fan, an exhauster or a deaeration condenser.

An advantageous development of the invention is distinguished by the fact that the separation column has a number of channels, which, in the direction of fall of the water flowing in from the water-injection means, are alternately arranged on casing walls facing one another, so that a meander-shaped path of fall forms for the water which is falling down.

Furthermore, it is of advantage if the channels are defined by baffles, which have openings in sections for the water to flow off, in which case these openings of the baffles of adjacent channels in the direction of fall of the water do not overlap or partly overlap. A direct flow path for the steam toward the mixing chamber is provided by this measure.

A further embodiment variant according to the invention is distinguished by the fact that the separation column has a packing, through which the water which is falling down trickles.

The apparatus for the heating-up and degassing is distinguished by the fact that the efficiency of the power station is increased, since only low-grade exhaust steam is used for the heating-up and degassing, a fact which relieves the load on the condenser. Furthermore, it is of remarkable significance that the apparatus for the heating-up and degassing, due to the common casing wall with the condenser, does not require a line connection either for the steam or for the water, flowing into the condenser, from the receiver.

BRIEF DESCRIPTION OF THE DRAWINGS

A more complete appreciation of the invention nd many of the attendant advantages thereof will be readily obtained as the same becomes better understood by reference to the following detailed description when considered in connection with the accompanying drawings of the cold end of a steam-turbine plant, wherein.

DESCRIPTION OF THE PREFERRED EMBODIMENTS

Figure 1:
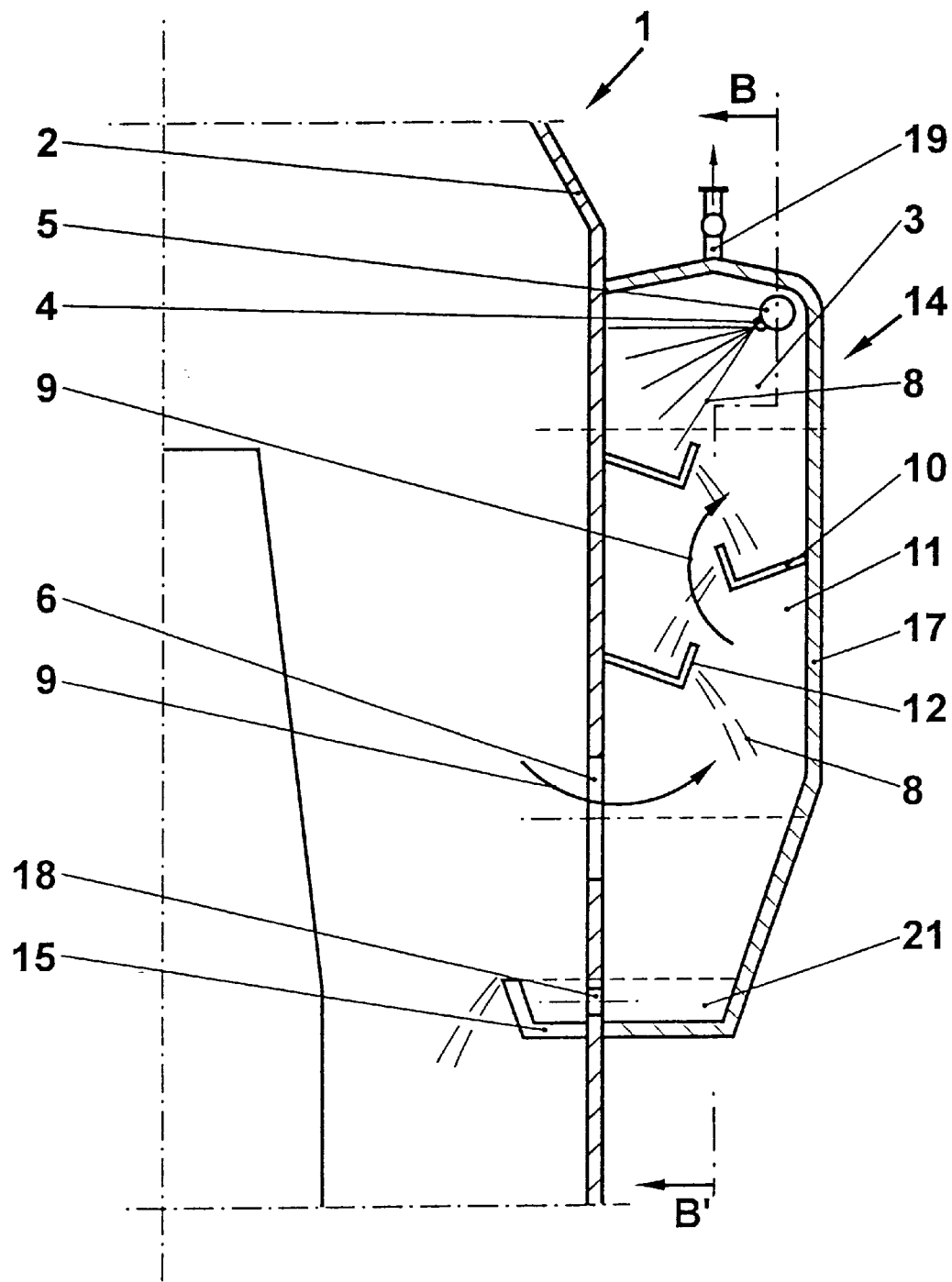
FIG. 1 shows a partial section through a condenser with integrated degassing apparatus.

Referring now to the drawings, wherein like reference numerals designate identical or corresponding parts throughout the several views, all parts of the plant which are not essential for understanding the invention, such as, for example, the actual steam and water circuit of the electric generating plant, are not shown, and the directions of flow of the media involved are designated by arrows.

Although direct-contact feed heaters/degassers are sufficiently known in structure and function, the problem with them and the solution found here may be explained with reference to a numerical example, which is not binding.

Degassing with simultaneous heating-up, as typically occurs in power station plants, has some distinctive features. First of all, saturated low-pressure steam, as a rule turbine exhaust steam, is available for the heating-up of the make-up water. This low-pressure steam has a moisture content of more than 10% and its temperature is normally between 20° C. and 50° C. Therefore the steam mass flow which is drawn off by the undercooled make-up water, and which usually flows into a surface condenser, is mainly determined by the undercooling of the make-up water, relative to the saturation temperature of the turbine exhaust steam. In other words, a natural steady-state condition appears in the degasser, and this depends only on the states and the intensity of the flows involved, without the effect of a control circuit for controlling said active variables.

The gases dissolved in the liquid are expelled in a first stage first of all on a purely thermodynamic basis, since the drop in the pressure due to the spraying and the increase in the temperature of the make-up water due to the heating-up with steam cause a reduction in the saturation values of the dissolved gases (bubbling effect). Consequently, the partial pressure of the dissolved gases exceeds the total pressure prevailing. For the degassing range aimed at here, most of the steam required overall for the heating-up and degassing is required in this stage of the process. On the basis of an initial $O_2$-concentration of 8000 ppb at 20° C., a reduction in the concentration to about 1800 ppb results at 100 mbar and 46° C. saturation temperature, in which case every kg of make-up water for heating up to saturation temperature already requires about 0.050 kg of dry saturated steam. The removal of the oxygen present in the gas phase, according to this first stage, is achieved by exhausting the residual steam flow enriched with inert gases. To this end, a proportion of the steam passed into the degassing space and enriched with the expelled gases is directed into the condenser air cooler. From there, it is delivered out of the plant by means of the exhaust system (not shown) of the condenser. Therefore, in this first stage, the make-up water is essentially freed of most of the gases, i.e. oxygen, but nitrogen and carbon dioxide too, by the make-up water being exposed to a low pressure and assuming the corresponding saturation conditions.

As can be seen from FIG. 1, this first stage of the heating-up and degassing of make-up water is effected in a so-called mixing chamber 3 of an apparatus, which is arranged directly on a casing wall 2 of a condenser 1 and shares a common casing wall 2 with this condenser 1. A multiplicity of water-injection means in the form of nozzles 4 are lined up in this mixing chamber 3. These nozzles are supplied via a common water line 5. The undercooled make-up water having the high $O_2$-concentration is sprayed into the mixing chamber 3 via the nozzles. When the make-up water is injected, it first of all expands to the condenser pressure prevailing in the mixing chamber. In the process, this water is abruptly degassed to the abovementioned $O_2$-concentration of about 1800 ppb (at 100 mbar).

Since the make-up water is considerably cooler than the saturation temperature in the condenser, the make-up water has a suction effect. Steam flows from below out of a separation column 11 into the mixing chamber and most of this steam condenses in the mixing chamber upon contact with the make-up water 8. The excess steam quantity is enriched with inert gases during the thermal equalizing action. This enriched steam is drawn off via a deaeration line 19 above the region into which make-up water 8 is injected. For this purpose, the deaeration line 19 is connected either to a condenser air cooler (not shown) or directly to an exhauster.

The decisive and more difficult portion of the residual degassing takes place in a second stage purely through physical kinetics by diffusive transport of the dissolved gases across the gas/liquid boundary layer. This transport process cannot take place until thermal equilibrium has been reached. The working process of this second stage is substantially more complicated than that of the first stage.

Figure 2:
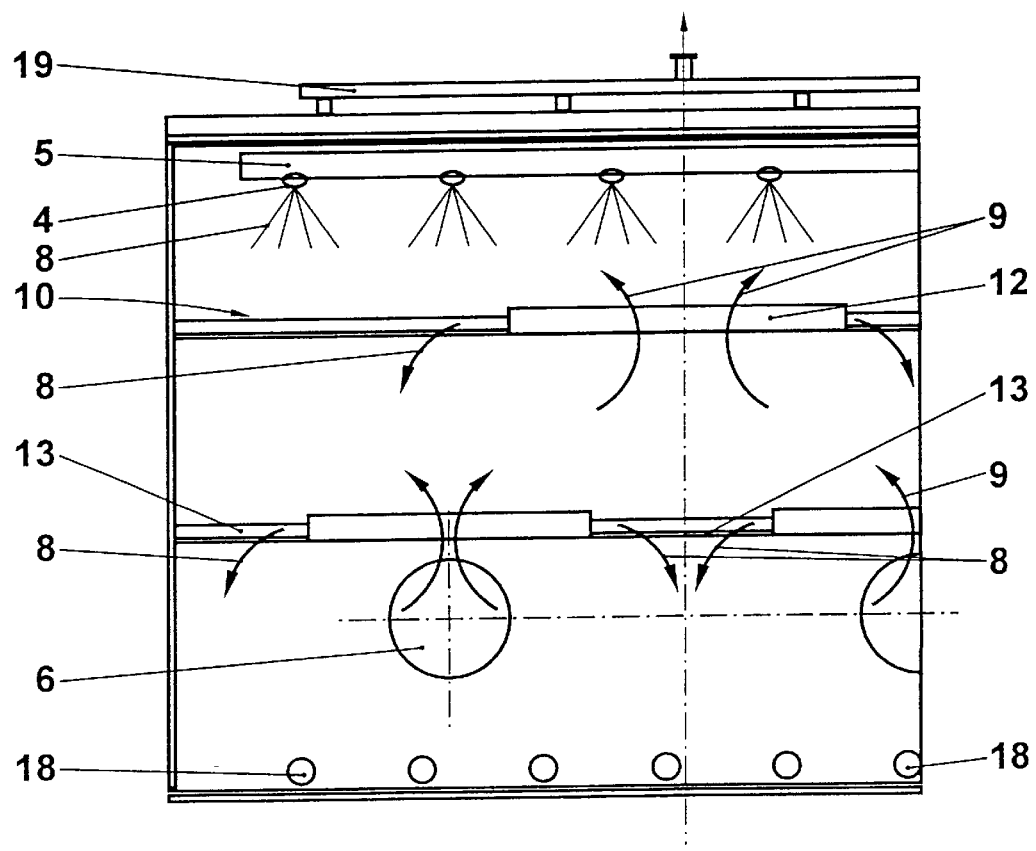
FIG. 2 shows a partial section through the degassing apparatus.

Starting from saturated make-up water, the use of a gas-liquid contact apparatus in counterflow circuit for achieving maximum separation work is now appropriate. A separation column 11 is used, but it requires a minimum steam quantity for its operation. this quantity of so-called purging steam amounts to about 10% of the total steam quantity required for the heating-up. The separation column 11 is arranged below the mixing chamber 3 and comprises a number of channels 10, three in the exemplary embodiment, which, in the direction of fall of the make-up water 8 coming out of the mixing chamber, are attached alternately to casing walls 2, 17 facing one another. These channels 10 are laterally defined by the casing walls 2, 17 and by baffles 12. In conjunction with FIG. 2, it can be seen that the baffles 12 are provided with openings 13, from which water can flow off in a specific manner to the next lower-lying channel 10. The make-up water 8 therefore flows in a meander-shape from the uppermost channel 10 to the lowermost and from there into a receiver 21. The openings 13 in the baffles 12 of the adjacent channels 10 are distributed in such a way that they never completely overlap one another. This prevents the formation of an almost steam-tight water curtain, which could prevent a desired, direct steam flow through the separation column 11 into the mixing chamber 3.

The apparatus 14 for the heating-up and degassing is supplied with steam through one or more steam-inlet openings 6 in the casing wall 2 of the condenser 1. In this way, the apparatus draws in low-grade exhaust steam, for example from a turbine (not shown), which is then used for the heating-up and degassing of make-up water 8. Heated-up and degassed make-up water 8 is collected in the receiver 21 and fed to the condenser 1 and thus to the water circuit via a water-outlet opening 18 in the casing wall 2.

The use of a filling body (not shown) instead of the channels 10 in the separation column 11 is also conceivable within the scope of the invention. A combination of one or more filling bodies with one or more channels 10 is also conceivable according to the invention. Here, it should be mentioned that the filling body may be composed of an irregular bulk fill or is formed by a regular packing, a bypass through or at the separation column 11 for the already described direct steam flow toward the mixing chamber 3 being ensured in both applications.

Most of the residual gas quantity is eliminated from the water in the separation columns 11 described. The removal of this gas/steam mixture is likewise carried out via the deaeration line 19.

A considerable saving with regard to pipe installation, in addition to the energy for the described processes which otherwise has to be applied, can be made with the apparatus according to the invention for the heating-up and degassing of make-up water.

Integration of the entire apparatus 14 for the heating-up and degassing inside the condenser casing is likewise conceivable within the scope of the invention. Here, a receiver 21 could even be dispensed with.

Obviously, numerous modifications and variations of the present invention are possible in light of the above teachings. It is therefore to be understood that, within the scope of the appended claims, the invention may be practiced otherwise than as specifically described herein.

What is claimed is:

1. An apparatus for the heating-up and degassing of oxygen-rich make-up water by means of steam in a power station plant comprising: a steam condenser having a casing wall, a second casing wall mounted on the steam condenser casing wall, the casing walls being spaced apart and forming a mixing chamber and a separation column, the mixing chamber being located above the separation column, the mixing chamber including a means for spraying oxygen-rich make-up water, a receiver positioned to collect water from the separation column and including a water outlet opening in fluid communication with an interior of the steam condenser, the steam condenser casing wall having a steam-inlet opening located between the receiver and the separation column through which steam-inlet opening steam flows into and through the separation column and into the mixing chamber due to a lower pressure prevailing in the mixing chamber relative to a pressure in an interior of the condenser, and the mixing chamber including a gas-outlet opening for drawing off an enriched steam.

2. The apparatus as claimed in claim 1, wherein the deaeration line (19) is connected to a condenser air cooler.

3. The apparatus as claimed in claim 1, wherein the deaeration line (19) is connected to an exhauster.

4. The apparatus as claimed in claim 1, wherein the deaeration line (19) is connected to a deaeration condenser.

5. The apparatus as claimed in claim 1, wherein the separation column includes a plurality of channels alternately arranged on the casing walls in a direction of flow of the oxygen-rich make-up water from the means for spraying oxygen-rich make-up water to the reservoir, each of the plurality of channels including a baffle having at least one opening for the flow of oxygen-rich make-up water to an adjacent channel, the openings of the baffles of adjacent channels being arranged in the direction of flow of the oxygen-rich make-up water so that the openings do not completely overlap one another such that a meander-shaped path of flow of the oxygen-rich make-up water forms.

6. The apparatus as claimed in claim 1, wherein the separation column includes a filling body through which the oxygen-rich make-up water trickles, the filling body also including a plurality of passages for the flow of steam in a direction against the direction of trickle of the oxygen-rich make-up water.

7. The apparatus as claimed in claim 1, wherein the second casing wall is mounted on an exterior of the steam condenser casing wall.

* * * * *